(12) United States Patent
Nogami et al.

(10) Patent No.: US 9,045,171 B2
(45) Date of Patent: Jun. 2, 2015

(54) WORK VEHICLE

(71) Applicant: KUBOTA CORPORATION, Osaka (JP)

(72) Inventors: Kazuaki Nogami, Osaka (JP); Hiroyuki Tada, Osaka (JP); Yoshiyuki Esaki, Osaka (JP); Kazutomo Miyaguchi, Osaka (JP); Eiji Sato, Osaka (JP); Akira Minoura, Osaka (JP); Hironori Tsuchihashi, Wakayama (JP); Osami Fujiwara, Osaka (JP); Seiya Yoshida, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 13/782,445

(22) Filed: Mar. 1, 2013

(65) Prior Publication Data

US 2014/0014429 A1    Jan. 16, 2014

(30) Foreign Application Priority Data

Jul. 11, 2012  (JP) .................................. 2012-155391

(51) Int. Cl.
    *B62D 25/10*    (2006.01)
(52) U.S. Cl.
    CPC .............. *B62D 25/105* (2013.01); *B62D 25/10* (2013.01)

(58) Field of Classification Search
    USPC ............................................. 180/69.2–69.25
    See application file for complete search history.

(56) References Cited

U.S. PATENT DOCUMENTS

| 7,096,987 B2 * | 8/2006 | Moen et al. .................. 180/69.2 |
| 2013/0074410 A1 * | 3/2013 | Berkeland ....................... 49/142 |

FOREIGN PATENT DOCUMENTS

| JP | 2006-341743 | 12/2006 |
| JP | 2008-074293 | 4/2009 |
| JP | 2009-240214 | 10/2009 |
| JP | 2012-026326 | 2/2012 |

* cited by examiner

*Primary Examiner* — Jeffrey J Restifo
(74) *Attorney, Agent, or Firm* — Greenblum & Bernstein, P.L.C.

(57) ABSTRACT

A work vehicle includes a fixed hood covering a rear area of an engine compartment housing an engine and an engine accessory, a swing axis extending through the rear area of the engine compartment in a transverse direction of the vehicle, and a swing hood swinging around the swing axis between a closed position and an open position. The swing hood tucks the fixed hood inside the swing hood and thus covers the fixed hood in the open position, and covers a front area and a middle area of the engine compartment and overlaps with a front end portion of the fixed hood in the closed position.

16 Claims, 10 Drawing Sheets

WORK VEHICLE

CROSS-REFERENCE TO RELATED APPLICATIONS

The present application claims priority under 35 U.S.C. §119 of Japanese Application No. 2012-155391, filed on Jul. 11, 2012, which is herein expressly incorporated by reference in its entirety.

BACKGROUND OF THE INVENTION

1. Field of the Invention

The present invention relates to a work vehicle having an engine and engine accessories behind a driver seat.

2. Description of Related Art

Japanese Patent Laid-Open Publication No. 2009-240214 (paragraphs [0020] to [0036] and FIGS. 1 and 2; corresponding foreign application: US2009/0241498A1) discloses a mid-mount mower as a work vehicle, in which a driver seat is provided in a central portion of a vehicle frame supported on the ground by front and rear wheels and an engine and engine accessories are provided behind the driver seat. In this mid-mount mower, the engine and engine accessories, which are covered by a hood, are disposed in a space to the rear of the driver seat. The hood has a divided structure composed of two portions divided in a vertical direction (direction of height above the ground). The hood includes a rear cover connected to the vehicle frame and an upper cover pivoted at an upper rear portion of the rear cover. The rear space covered by the hood is divided into two spaces by a separation wall that includes a front wall and a bottom wall, the front wall extending along a front surface of the engine, the bottom wall extending along a bottom surface. The upper cover completely covers above the rear cover in a closed posture, and completely opens the space inside the upper cover in an open posture, in which the upper cover is swung so as to largely project rearward of the vehicle. The hood structure, meanwhile, requires a large space in the rear of the vehicle to open the upper cover.

Japanese Patent Laid-Open Publication No. 2008-074293 (paragraphs [0012] to [0015] and FIGS. 1 and 3; corresponding foreign application: U.S. Pat. No. 7,527,298B1) and Japanese Patent Laid-Open Publication No. 2006-341743 (paragraphs [0018] to [0026] and FIGS. 1 and 4) disclose a front mount mower as a work vehicle, in which an engine and engine accessories are provided behind a driver seat. In this front mount mower, an engine compartment covered by a hood includes the engine which is mounted in the rear of a left-right pair of main frames and the engine accessories, such as a radiator for cooling the engine, provided in front of the engine in the vehicle. Dustproof nets are provided at a front end and two front side surfaces of the hood to serve as engine cooling air inlets. The engine cooling air inlets are open on both outer lateral sides and a top side of the vehicle. A rotating cooling fan driven by the engine blows air. Thus, air outside the hood is suctioned through the engine cooling air inlets to the vicinity of the radiator in the hood, and then engine cooling air is generated and supplied to the radiator. To this end, an anteroposterior length of the vehicle is lengthened to increase an amount of cooling air flowing in from the engine cooling air inlets in the two side surfaces, and thus large spaces are formed on two sides of the radiator. A hood in Japanese Patent Laid-Open Publication No. 2006-341743 has a dustproof net formed of a perforated metal in a portion that covers the cooling fan and the radiator.

In order to meet stringent exhaust gas regulations, Japanese Patent Laid-Open Publication No. 2012-26326 (paragraphs [0012] to [0018] and FIGS. 1 and 2) discloses a front mount mower as a work vehicle, in which a diesel particulate filter (DPF) is mounted as an engine accessory. The DPF is a large engine accessory and has a high operating temperature. Thus, the DPF requires a sufficient space and a cooling environment. Accordingly, a hood, which is swung around a pivot in a rear of the vehicle to cover a large engine compartment, increases in size and weight, thus requiring a large force to open and swing the hood.

In view of the above, there is demand for a work vehicle that has an improved hood to cover an engine and engine accessories provided behind a driver seat.

SUMMARY OF THE INVENTION

An advantage of the present invention is to provide a work vehicle having an engine compartment supported by a vehicle frame behind a driver seat, the engine compartment housing an engine and an engine accessory and including a front area, a middle area, and a rear area. The work vehicle includes a fixed hood covering the rear area; a swing axis extending through the rear area in a transverse direction of the vehicle; and a swing hood swinging around the swing axis between a closed position and an open position. The swing hood tucks the fixed hood inside the swing hood and thus covers the fixed hood in the open position, and covers the front area and middle area and overlaps with a front end portion of the fixed hood in the closed position. Specifically, the fixed hood and the swing hood form a swing-type nesting structure. In the open position, the fixed hood is tucked into and covered by the swing hood.

Unless otherwise defined in particular in the present specification, the term "front" in a positional relationship denotes one running direction of a vehicle and the term "rear" denotes the other direction. Thus, an anteroposterior direction of the vehicle represents a longitudinal direction of the vehicle and a transverse direction of the vehicle represents a width direction of the vehicle.

In this configuration, the hood is divided into the fixed hood and the swing hood, each of which is thus more lightweight than a regular hood. In particular, a reduction in weight of the swing hood facilitates a swing operation of the swing hood. Furthermore, the fixed hood and the swing hood can be assembled individually. This facilitates not only transportation of each hood for hood assembly, but also assembly work. In addition, the swing hood is opened rearward around the rear swing axis, and then the fixed hood is tucked into and covered by the swing hood tucks in the open posture. This reduces a projection amount of the swing hood rearward of the work vehicle in the open position.

In the operation above, a swing range of the swing hood is from 90° to 120°. In an embodiment in which the swing hood is in a flat posture in the closed position and is in an upright posture in the open position, minimum openness is secured for the engine compartment and rearward projection of the swing hood is minimized in the open posture. This allows maintenance of the engine compartment even in a narrow space.

In an embodiment in which a DPF, which increases in temperature, is disposed in the rear area of the engine compartment, a heated DPF is covered by the fixed hood even when the swing hood is open, thus reducing a possibility that the heated DPF may be touched inadvertently. In addition, a flow of air from front to rear reaches the heated DPF at the end of the flow, thus eliminating a possibility that the flow of air to cool other devices may be heated by the DPF.

In one preferred embodiment to achieve the features of the hood structure according to the present invention, the fixed hood has a boxed shape covering the rear area and including a rear panel and a left-right pair of side panels, and the swing hood in the open position externally surrounds the rear panel and the left-right pair of side panels of the fixed hood.

To efficiently cool the engine compartment with the flow of air from front to rear, an engine is preferably disposed in the middle area of the engine compartment and a cooling fan and a radiator are preferably disposed in the front area separated from the middle area by a shroud extending in the transverse direction of the vehicle. To efficiently take air into the engine compartment from the front, in one preferred embodiment of the present invention, the swing hood has an external air intake in an area facing the front area of the swing hood in the open position.

In one preferred embodiment of the present invention, the swing hood has a bisected structure. This simplifies assembly of the swing hood and allows selection of materials for each divided element.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein.

DETAILED DESCRIPTION OF PREFERRED EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt made to show structural details of the present invention in more detail than is necessary for the fundamental understanding of the present invention, the description is taken with the drawings making apparent to those skilled in the art how the forms of the present invention may be embodied in practice.

Figure 1:
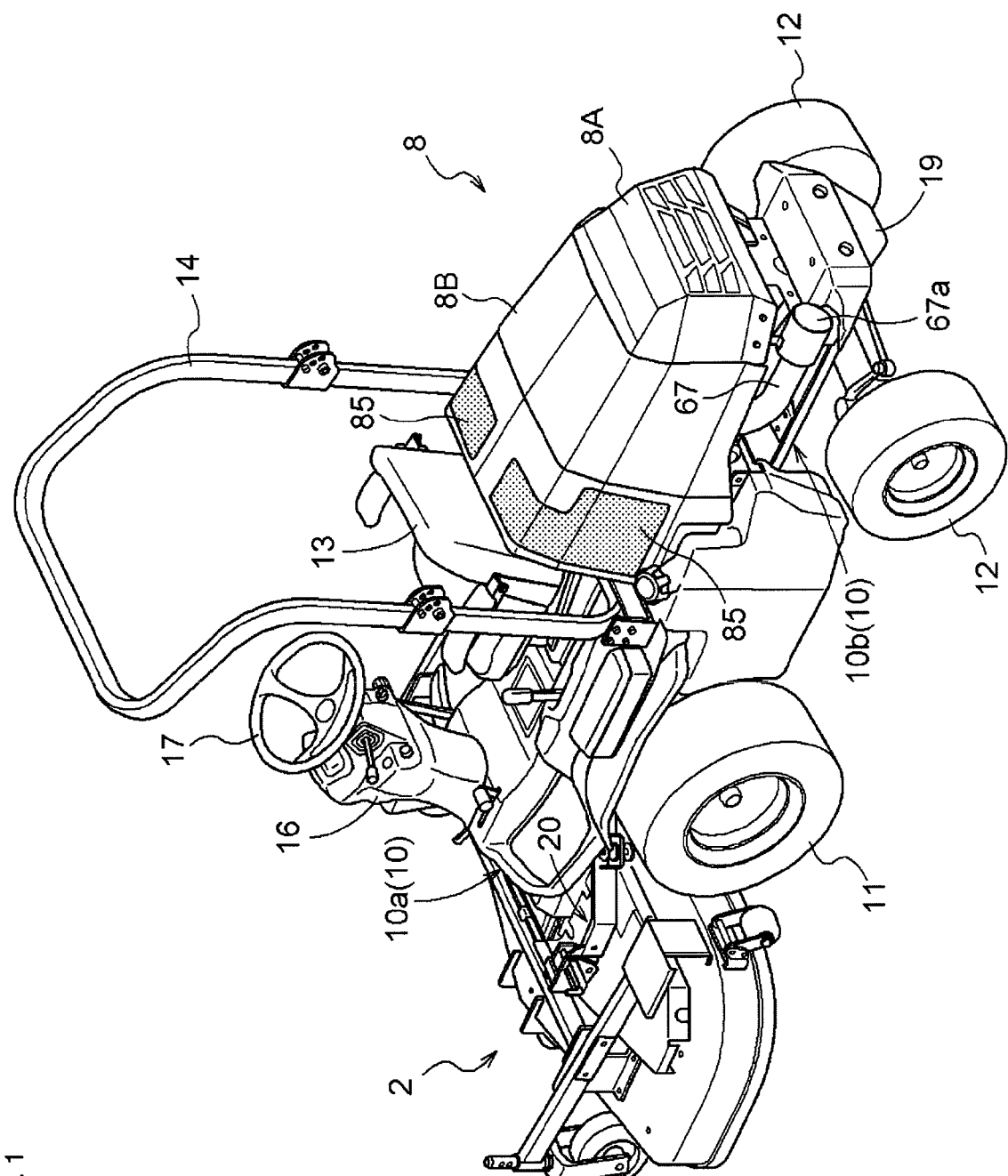
FIG. 1 is a perspective view of a front mount mower according to an embodiment of the present invention.

One embodiment of the present invention is described with reference to a front mount mower as an example of a work vehicle according to the present invention. With reference to FIG. 1, the front mount mower has a vehicle frame 10 including a front frame 10a and a rear frame 10b, and a left-right pair of front wheels 11 and a left-right pair of rear wheels 12 supported by the vehicle frame 10. In front of the front wheels 11, a blade-type mower unit 2 is suspended movably in a vertical direction from the vehicle frame 10 through a lift mechanism 20.

In the front of the vehicle frame 10, a handle post 16 stands to support a steering wheel 17. A driver seat 13 is provided behind the handle post 16 and slightly behind the front wheels 11. A ROPS 14 stands immediately behind the driver seat 13. With reference to FIGS. 2 to 7, an engine compartment 4, in which an engine 6 and engine accessories are disposed, is provided behind the ROPS 14, specifically in a rear half of the vehicle frame 10. The engine 6 herein is a water-cooled diesel engine. The engine accessories include a radiator 60, a cooling fan 62, an air cleaner 63, and a DPF 66.

Figure 5:
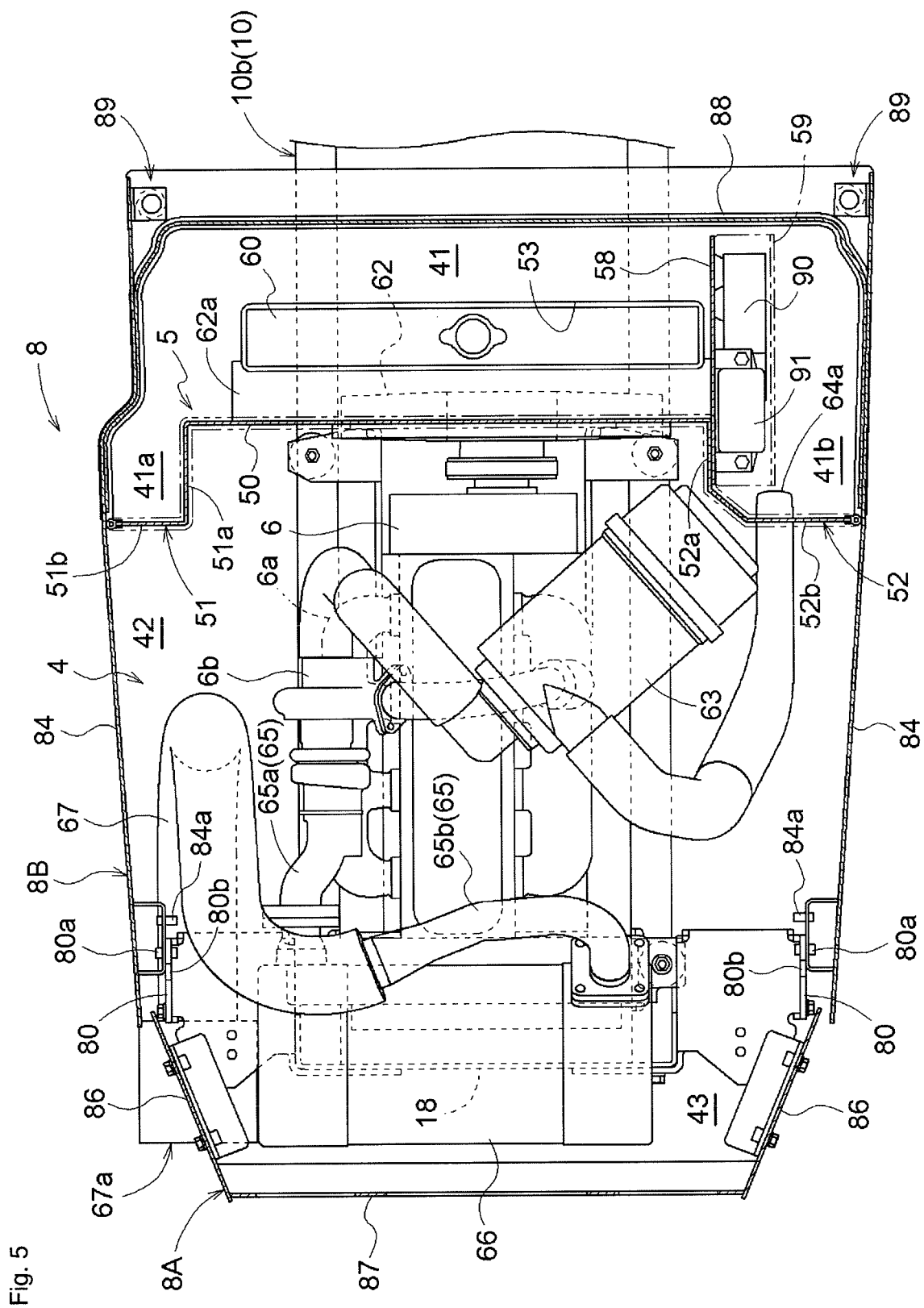
FIG. 5 is a plan view of the engine and the engine accessories disposed in the engine compartment.

As most clearly shown in FIG. 5, the engine compartment 4 can be divided, from front to rear in an anteroposterior direction of the vehicle, into a front area 41, a middle area 42, and a rear (rear end) area 43. A boundary between the front area 41 and the middle area 42 is defined by a shroud 5, which serves as a separation wall in a transverse direction of the vehicle. The radiator 60 and the cooling fan 62 are connected through a fan shroud 62a and are thus provided as one unit, which passes through an opening 53 provided in a lower side of the shroud 5. The radiator 60 is positioned in the front area 41 and the cooling fan 62 is positioned in the middle area 42.

In the middle area 42, the engine 6 is disposed and the cylindrical air cleaner 63 is disposed above the engine 6. The air cleaner 63 is provided above the engine 6 closer to a side from a central portion in the transverse direction of the vehicle. In the rear area 43 in the rear of the vehicle, the DPF 66 is disposed horizontally, preceding an exhaust pipe 65. A cylindrical exhaust end portion 67 including an exhaust outlet 67a that emits exhaust air from the DPF 66 is also disposed below the DPF 66 in the rear area 43.

A hood 8 that covers the engine compartment 4 from above is disposed above the rear frame 10b. The hood 8 is bisected in the anteroposterior direction of the vehicle into a fixed hood 8A covering the rear area and a swing hood 8B. With reference to a combination of FIGS. 2, 5, and 6, the fixed hood 8A is a box-shaped body having openings in a front and a bottom. The fixed hood 8A includes a left-right pair of side panels 86 and a rear panel 87 that includes an inclined surface extending downward obliquely in the anteroposterior direction and a perpendicular surface extending perpendicularly therefrom. The fixed hood 8A is fixed to a support 18 standing from the rear frame 10b so as to cover the rear area of the engine compartment 4, specifically, an upper surface, left and right side surfaces, and a rear surface of an upper half portion of the rear area 43. The fixed hood 8A also serves as a case for the heated DPF 66, and thus the rear plate 87 is mostly composed of a mesh plate.

Figure 2:
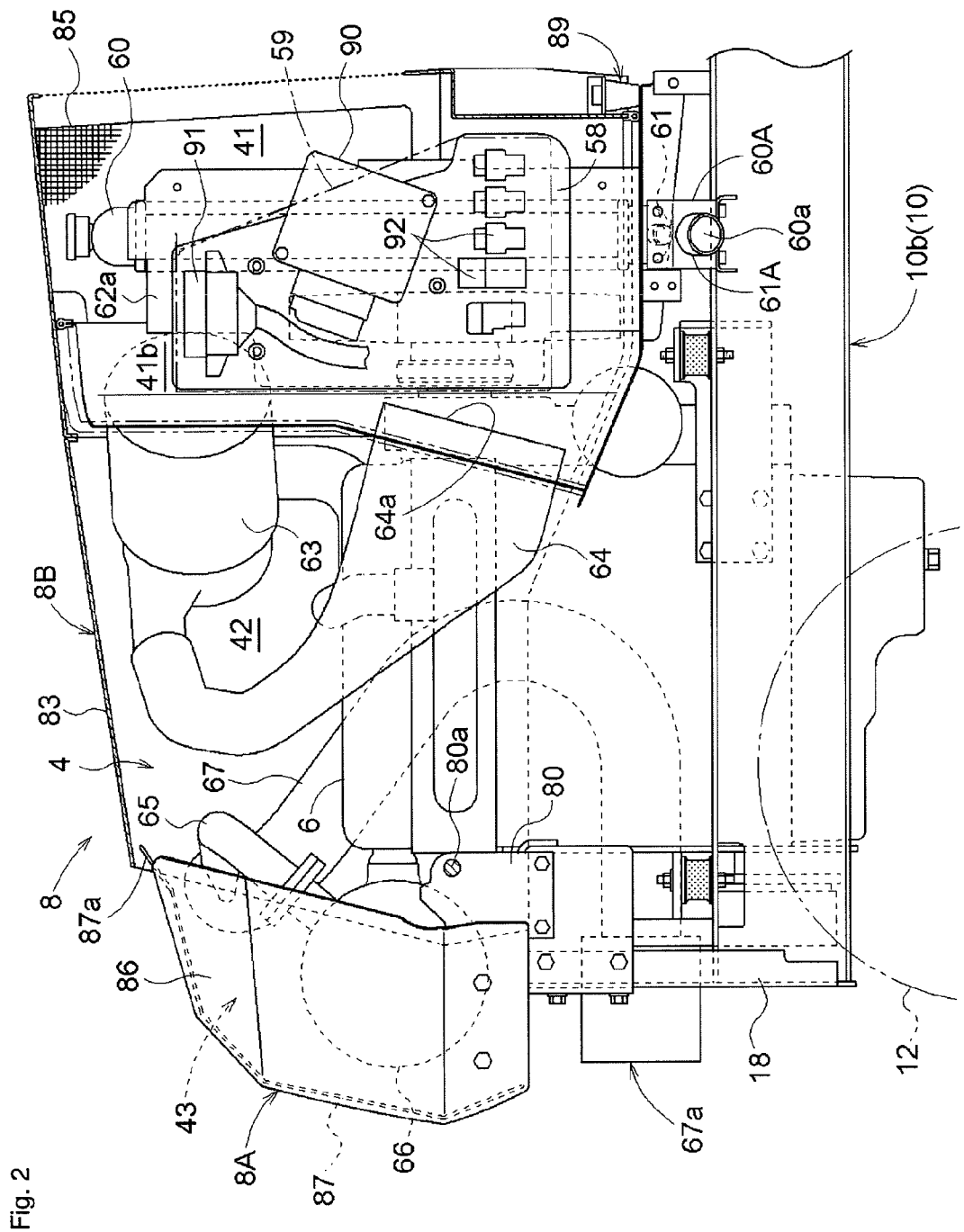
FIG. 2 is a side view of an engine and engine accessories disposed in an engine compartment.
Figure 3:
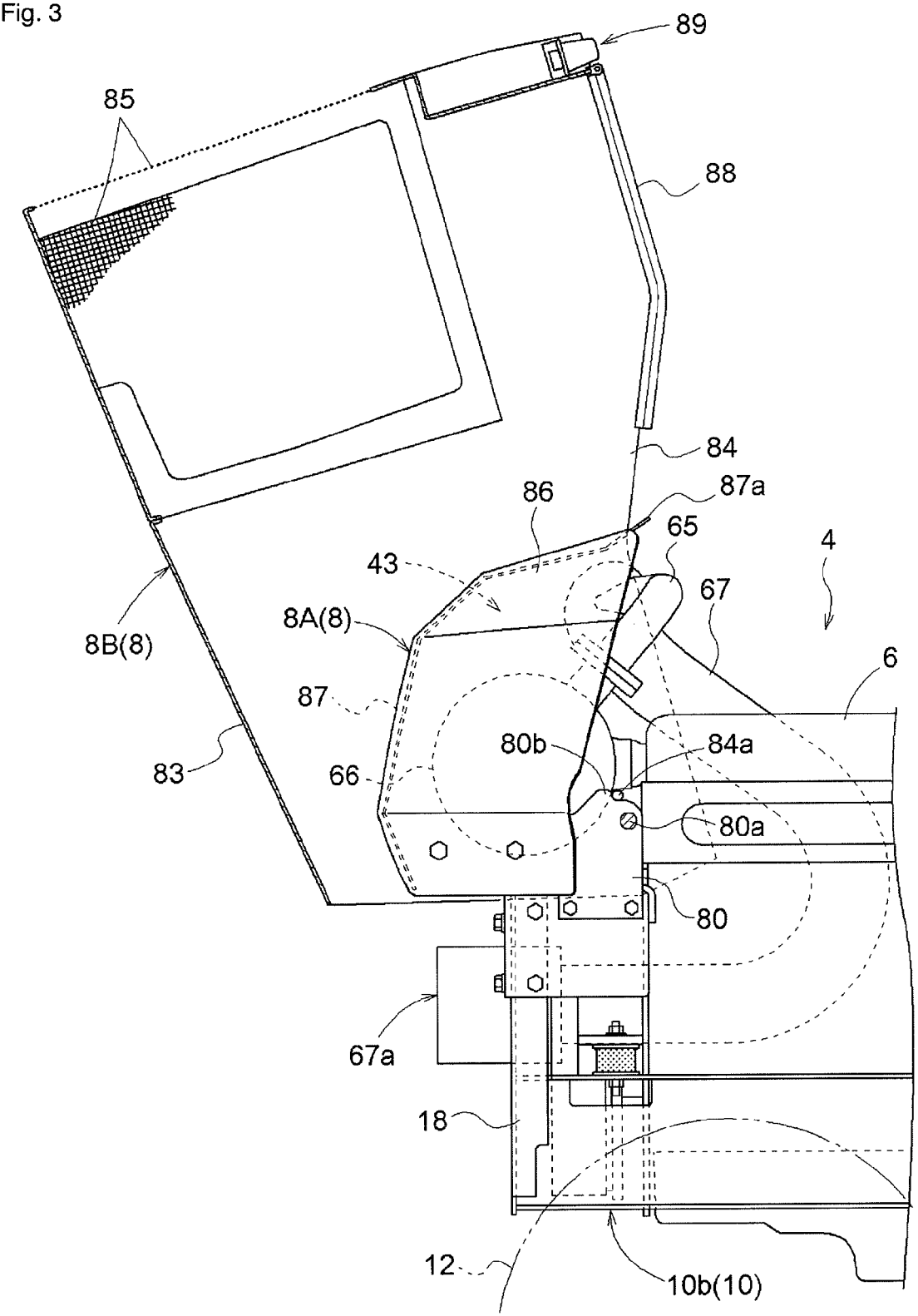
FIG. 3 is a side view of a DPF, a fixed hood, and a swing hood disposed in a rear area of the engine compartment.
Figure 4:
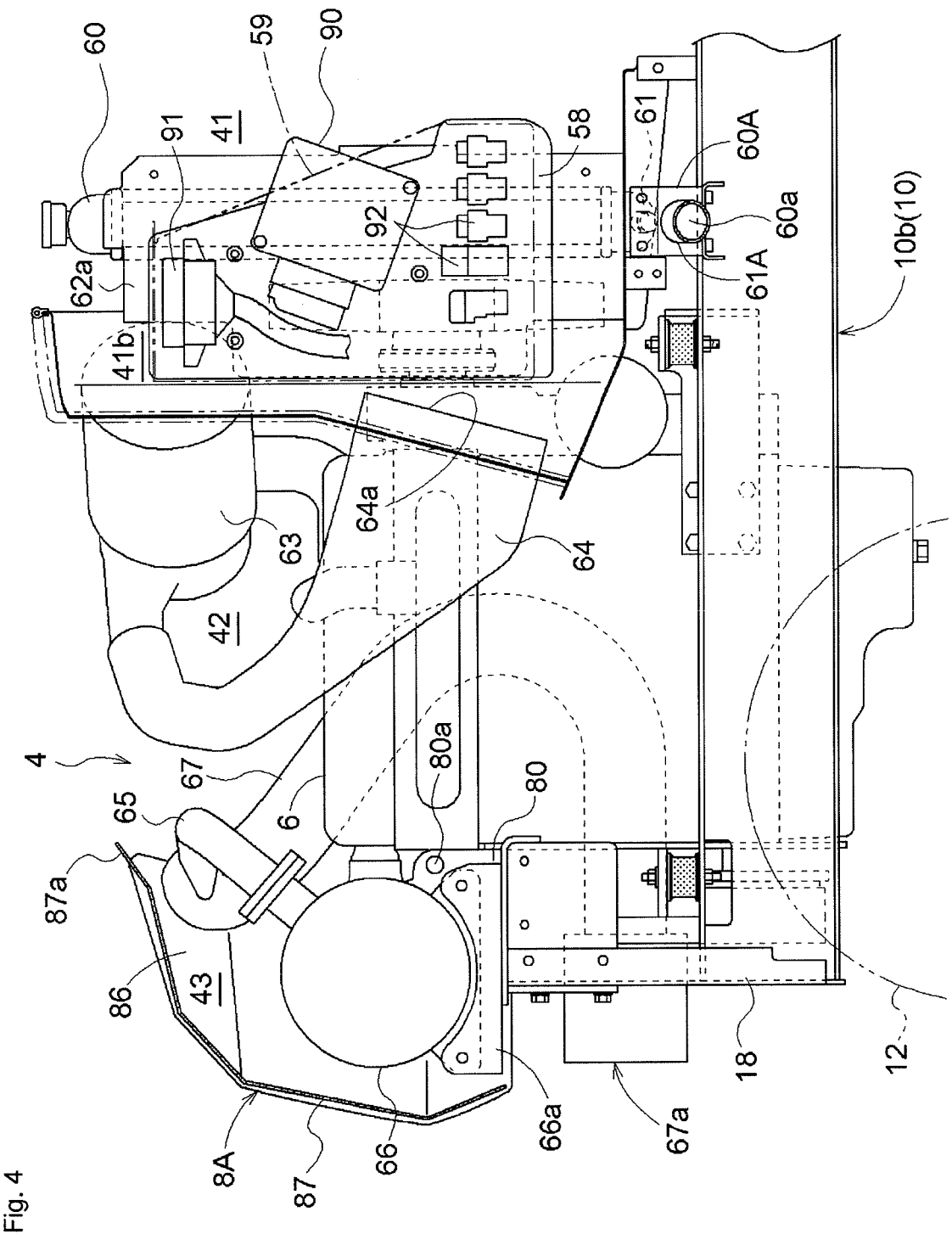
FIG. 4 is a side view of the engine and the engine accessories disposed in the engine compartment.

With reference to FIG. 3, a pivot bracket 80 is provided to the support 18 in a position proximate to the middle area 42. The pivot bracket 80 has a swing axis 80a extending in the transverse direction of the vehicle at substantially the same position as the DPF 66. With reference to a combination of FIGS. 2 and 5, the swing hood 8B includes a top panel 83 and a left-right pair of side panels 84 and has an arcuate cross section. With reference to FIG. 3, the swing hood 8B is swingable around the swing axis 80a between a closed position and an open position for an angle range from 90° to 120°

(105° in the present embodiment). The fixed hood 8A and the swing hood 8B form a swing-type nesting structure. The swing hood 8B in the open position tucks the fixed hood 8A inside the swing hood 8B, and thus substantially covers the fixed hood 8A from outside. The swing hood 8B in the closed position covers the front area 41 and the middle area 42 of the engine compartment 4 and overlaps with a front end portion of the fixed hood 8A, and thus substantially covers the entire engine compartment 4. Specifically, the swing hood 8B in the closed position is in a flat posture to cover the front area 41 and the middle area 42 of the engine compartment 4, while the swing hood 8B in the open position is in substantially an upright posture to tuck in and cover the fixed hood 8A.

Figure 6:
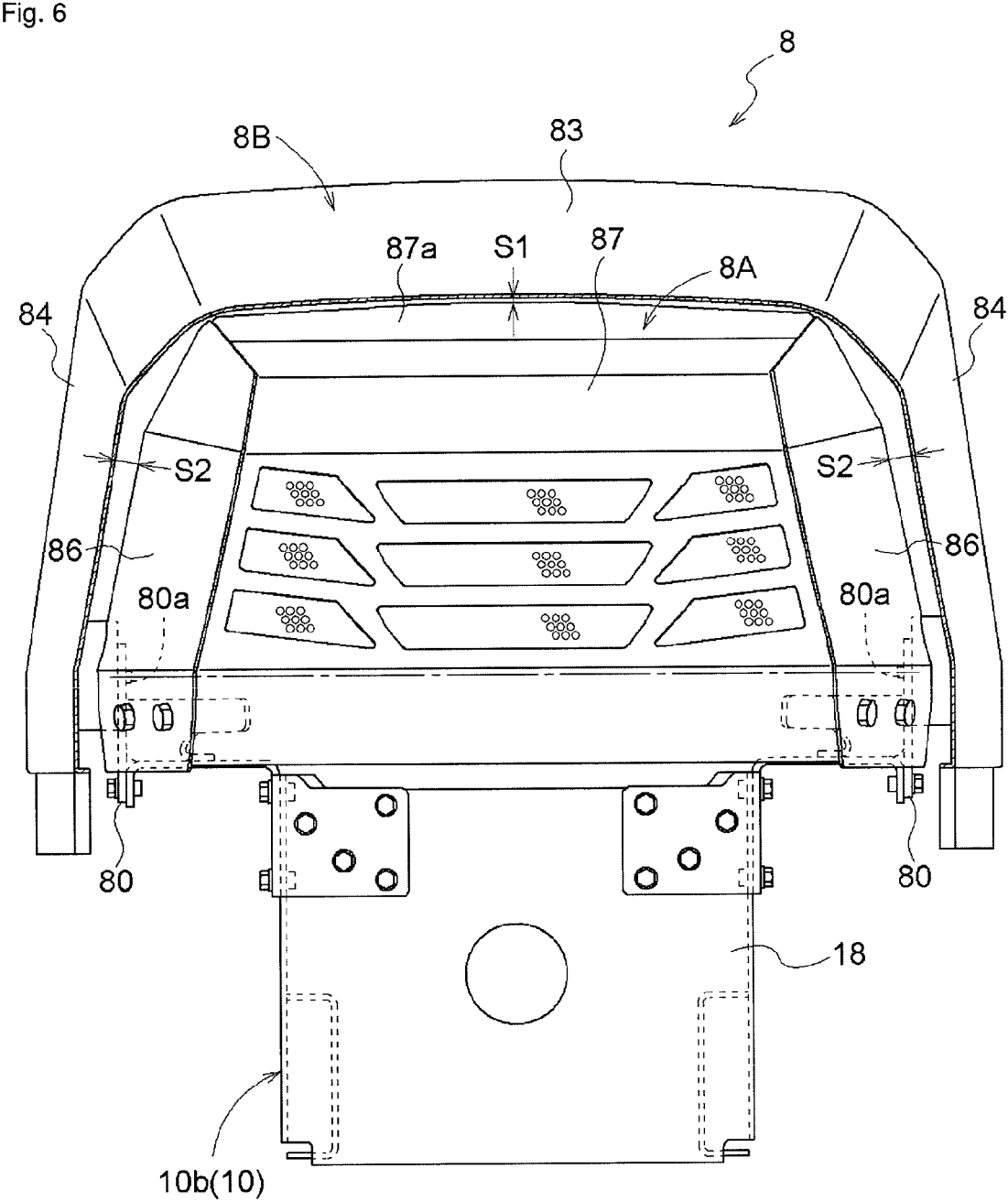
FIG. 6 is a rear view of the fixed hood and the swing hood.

The swing hood 8B in the closed position surrounds the side panels 86 and the rear panel 87 of the fixed hood 8A with clearances therebetween. In the swing hood 8B in the closed position, as shown in FIG. 6, a first clearance S1 is provided between the top plate 83 of the swing hood 8B and the rear plate 87 of the fixed hood 8A, and second clearances S2 are provided between the side plates 84 of the swing hood 8B and the side plates 86 of the fixed hood 8A. As clearly shown in FIG. 4, an end portion of the rear panel 87 of the fixed hood 8A is an upward projection 87a bending and projecting upward. This substantially narrows the first clearance S1. In contrast, the second clearances S2 are relatively wide compared to the first clearance S1. Thus, a flow of air from the engine compartment 4 is unlikely to flow out through the first clearance S1, but smoothly flows out through the second clearances S2. In this configuration, the flow of air passing through the radiator 60 and the engine compartment 4 flows into the vicinity of the DPF 66 with a limited amount flowing out from the first clearance S1. For continuous fresh air supply, the second clearances S2 are formed to be relatively wide to allow the flow of air from the engine compartment 4 to flow out smoothly. This effectively cools the DPF 66.

With reference to FIGS. 3 and 5, a stopper mechanism is provided in the present embodiment in order to hold the swing hood 8B in the open position, which is reached by a swing of 90° or greater from the flat posture. The stopper mechanism includes a stopper pin 84a and a stopper receiver 80b. The stopper pin 84a extending horizontally is provided on an inner surface of the side panel 84 of the swing hood 8B. The stopper receiver 80b is provided in an upper end portion of the pivot bracket 80. The stopper receiver 80b includes a guide surface and a stopper receiving surface standing from the guide surface. The guide surface has a surface along a swing trajectory of the stopper pin 84a associated with the swing of the swing hood 8B. The stopper pin 84a is brought into contact with the stopper receiving surface, and thus the swing hood 8B is held in the open position. The stopper receiver 80b is a fixing stand and may be provided in a location other than the pivot bracket 80, such as, for example, the fixed hood 8A and the vehicle frame 10.

In the closed position of the swing hood 8B, as shown in FIG. 3, a lower end or rib thereof is in contact with the rear frame 10b or a floor plate 15 supported by the rear frame 10b, and thus the swing hood 8B is supported. To reduce a shock of the contact, the lower end is provided with a trim, which is an elastic body to be attached for shock absorption (for example, an attached rubber member 88).

Figure 8A:
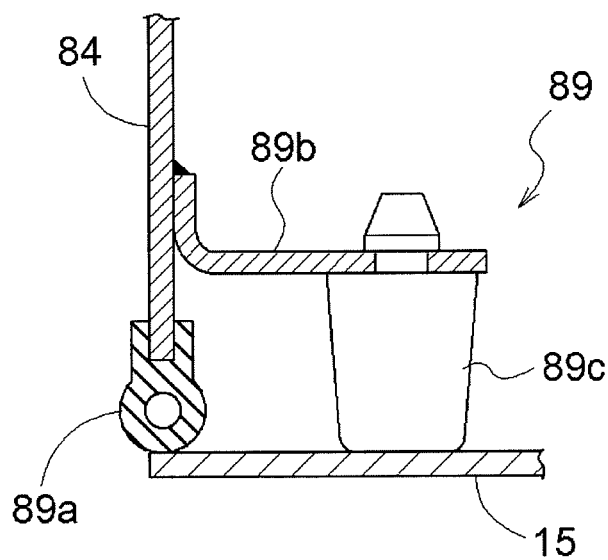
FIGS. 8(a) and 8(b) are each a schematic view illustrating a contact structure of the swing hood and a vehicle frame.
Figure 8B:
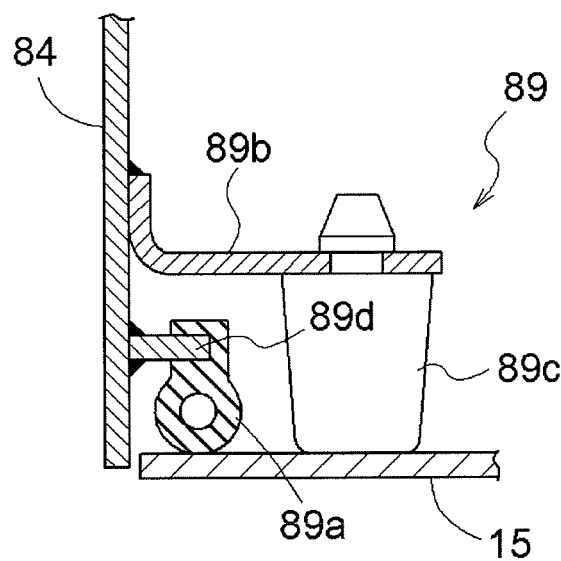

An area in a front end portion of the swing hood 8B in contact with and supported by the floor plate 15 is provided with a shock absorber 89, as shown in FIGS. 8(*a*) and 8(*b*). The shock absorber 89 shown in FIG. 8(*a*) includes an attached elastic body and a cushioning body 89c. The attached elastic body (for example, an attached rubber member 89a) is directly attached to a lower end of the side plate 84 of the swing hood 8B. The cushioning body 89c is attached to a bracket 89b projecting from the inner surface of the side plate 84. The cushioning body 89c, which has a greater elastic strength than the attached rubber member 89a, hardly deforms in the closed position of the swing hood 8B, and thus allows the swing hood 8B to maintain the closed posture accurately. The attached rubber member 89a, which deforms greatly during contact, ensures a reliable seal between the swing hood 8B and the floor plate 15 due to its deformation. The shock absorber 89 shown in FIG. 8(*b*) is a modification of FIG. 8(*a*), in which an attached rubber member 89a is attached to a support plate 89d projecting from an inner surface of a side plate 84.

The cooling fan 62 connected to an output axis of the engine 6 is rotated and driven to take external air into the front area 41 of the engine compartment 4, and then blow the air, which passes through the radiator 60, to the middle area 42 covered by the swing hood 8B and the rear area 43 covered by the fixed hood 8A.

With reference to FIG. 5, the shroud 5 divides the engine compartment 4 into a first area, which is the front area 41, and a second area, which includes the middle area 42 and the rear area 43. The shroud 5 includes a central portion 50 and left and right side portions 51 and 52 connected to side ends of the central portion 50. The central portion 50 extends along a rear surface of the radiator 60 whose cooled surface (front surface) is disposed in the transverse direction of the vehicle. In the present embodiment, both the left and right side portions 51 and 52 are projections extending rearward and outward from the two sides of the central portion 50. Alternatively, either of the portions may be a projection and the other portion may extend in the transverse direction of the vehicle directly from the central portion 50. The side portions 51 and 52, specifically, the projections 51 and 52, are angled bodies bent at an angle of 90° including vertical plates 51a and 52a, respectively, extending in the anteroposterior direction and horizontal plates 51b and 52b, respectively, extending in the transverse direction. Thus, extended areas 41a and 41b each projecting toward the middle area 42 are defined on the two sides of the front area 41 in the transverse direction of the vehicle.

Figure 7:
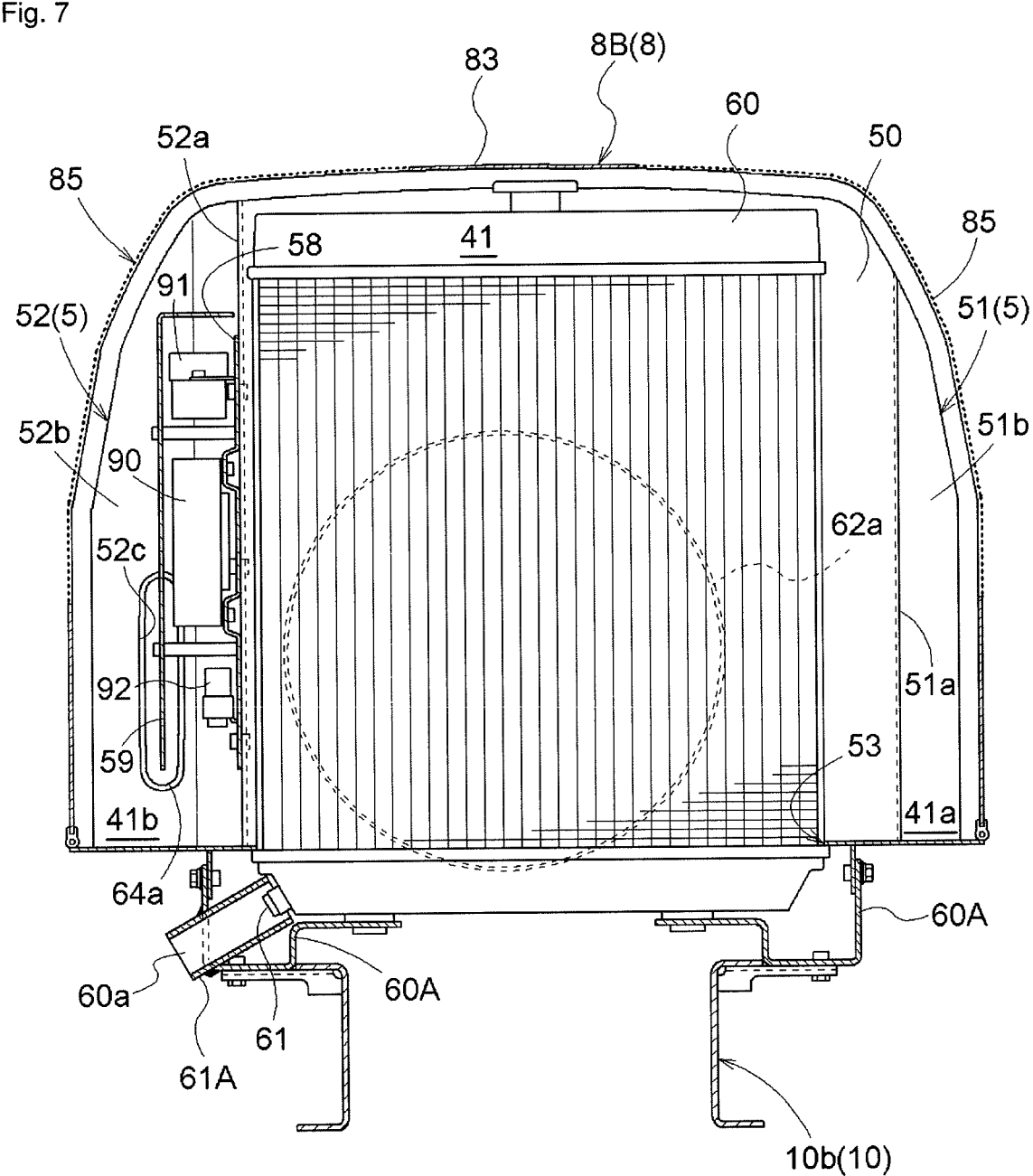
FIG. 7 is a front view of the engine compartment viewed from a front of a radiator.

In the present embodiment, an electronic control unit (hereinafter referred to as ECU) 90 is disposed in the extended area 41b defined by one of the projections (52 on the right) provided on the two sides of the shroud 5. Specifically, a bracket 58 is fixed to the vertical plate 52a of the projection 52 and the rectangular parallelepiped ECU 90 is fixed to a central portion of the bracket 58. With reference to FIG. 7, a fuse box 91 is mounted in an upper portion of the bracket 58 and a coupler 92 for electric components is mounted in a lower portion of the bracket 58 to connect a control device controlled by the ECU 90, the ECU 90, and a power source.

Furthermore, a through-hole 52c elongated in the vertical direction is provided in a central portion of the horizontal plate 52b of the projection 52. Through the through-hole 52c, an intake duct 64 extending from the air cleaner 63 extends from the middle area 42 into the front area of the engine compartment 4. Specifically, an air inlet 64a provided in a front end portion of the intake duct 64 is positioned in the extended area 41b, which is in the front area 41 of the engine compartment 4. Thus, the air cleaner 63 suctions fresh air from the front area 41. Alternatively, the ECU 90, the coupler 92 for electric components, and the air inlet 64a of the intake duct 64 may be disposed separately in the extended areas 41a and 41b on the two sides. In a case where the projection 52 is provided only on one side of the shroud 5, the ECU 90, the coupler 92, and the air inlet 64*a* are disposed in the extended area 41*b*.

With reference to FIG. 7, in the swing hood 8B in the closed position, a portion of an external air intake 85 in the side panel 84 of the swing hood 8B is disposed so as to face the ECU 90. In the present embodiment, the external air intake 85 is provided as a perforated portion of the hood having a net structure. Since a portion of the external air intake 85 faces the ECU 90, cooling air entering from the external air intake 85 into the extended area 41*b* and around the radiator 60 passes through the ECU 90, and thus the cooling air is effectively supplied to the ECU 90. Furthermore, the air inlet 64*a* of the air cleaner 63 disposed in the extended area 41*b* causes a strong air current, which is advantageous to cooling of the ECU 90.

In the present embodiment, a protection plate 59 is provided to completely cover a surface of the ECU 90 that faces the external air intake 85. The protection plate 59 protects the ECU 90 from rain water or washing liquid entering through the external air intake 85. Furthermore, the protection plate 59 can also serve as a heat sink by bringing the protection plate 59 into contact with a housing of the ECU 90 so as to transfer heat or by providing fins on an outer surface of the protection plate 59.

With reference to FIG. 5, exhaust air from the engine 6 flows through the exhaust pipe 65, which includes an upstream exhaust pipe 65*a* and a downstream exhaust pipe 65*b*. The DPF 66 is provided between the upstream exhaust pipe 65*a* and the downstream exhaust pipe 65*b*. A first end of the upstream exhaust pipe 65*a* is connected to an exhaust collector pipe 6*b* connected to an exhaust manifold 6*a* of the engine 6 while a second end thereof is connected to the DPF 66. A first end of the downstream exhaust pipe 65*b* is connected to the DPF 66 while a second end thereof is connected to the exhaust end portion 67. The cylindrical DPF 66 is horizontally fixed to a DPF support member 66*a* fixed to the support 18 such that a longitudinal direction thereof is aligned with the transverse direction of the vehicle. In this position, the DPF 66 is substantially covered by the fixed hood 8A from above, left and right sides, and behind.

The exhaust gas which is cleaned through the DPF 66 passes through the downstream exhaust pipe 65*b* extending from the DPF 66 and is emitted rearward of the vehicle from the exhaust outlet 67*a* of the exhaust end portion 67. Immediately after flowing into a start section of the downstream exhaust pipe 65*b*, the exhaust gas has a very high temperature of approximately 600° C. To reduce the temperature of the exhaust gas emitted from the exhaust outlet 67*a* to a temperature of approximately 270° C., the downstream exhaust pipe 65*b* has structural features described below to ensure a sufficient cooling section.

The start section of the downstream exhaust pipe 65*b* extends forward and upward from a side end area of the DPF 66. A first middle section, which extends from the start section, of the downstream exhaust pipe 65*b* extends in the longitudinal direction of the DPF 66 in front of the DPF 66. The first middle section, which is positioned above the engine 6, can effectively receive cooling air flowing through the middle area 42 of the engine compartment 4. With reference to FIG. 2, a second middle section, which extends from the first middle section, of the downstream exhaust pipe 65*b* turns forward and downward, extends obliquely on the side of the engine 6, turns rearward again, extends along the anteroposterior direction of the vehicle immediately above the rear frame 10*b*, and connects to the exhaust end portion 67. The second middle section, which is positioned on the side of the engine 6 as shown in FIG. 2, can effectively receive cooling air flowing through the middle area 42 of the engine compartment 4. Due to the complex curved shape, the downstream exhaust pipe 65*b* is preferably produced from a plurality of pipe materials. In the present embodiment, the pipe diameter is larger for pipe materials further downstream side. Furthermore, a gap is secured in the radial direction in the connection area. Thus, the pipes are connected such that air is taken from the vicinity due to an ejector effect. The downstream exhaust pipe 65*b* and the exhaust end portion 67 are connected in a similar manner in which the pipe diameter of the exhaust end portion 67 is larger than that of the downstream exhaust pipe 65*b* and a gap in the radial direction is secured.

With reference to FIG. 1, a cast weight 19 is mounted immediately below the fixed hood 8A. The exhaust end portion 67 is disposed on a curved surface extending in the anteroposterior direction of the vehicle on an upper surface of the weight 19. The weight 19, which extends rearward from the rear end of the exhaust end portion 67, prevents the exhaust end portion 67 from directly colliding with an obstacle when the vehicle backs up.

Figure 9:
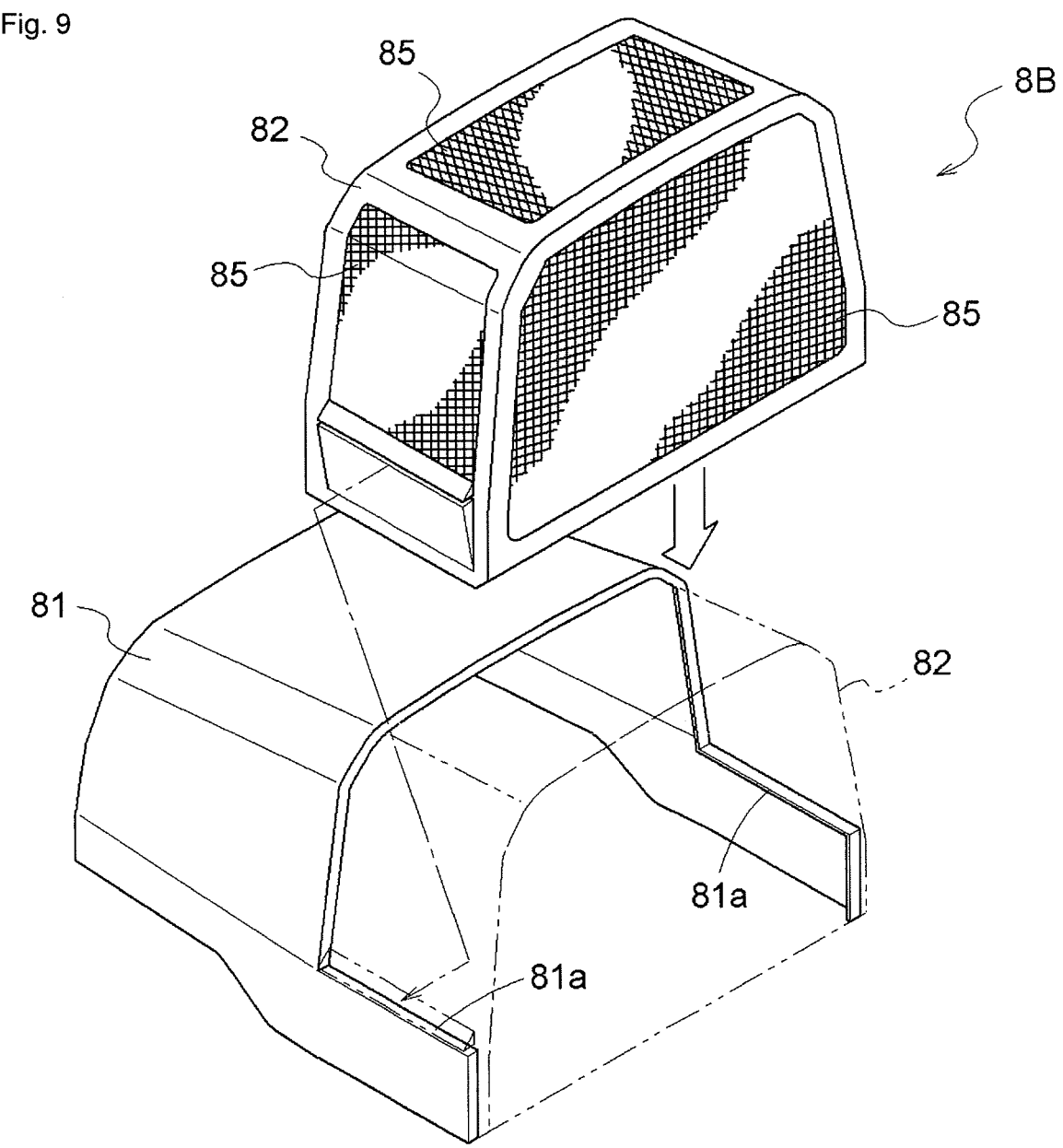
FIG. 9 is a schematic view illustrating a swing hood having a divided structure according to another embodiment.
Figure 10:
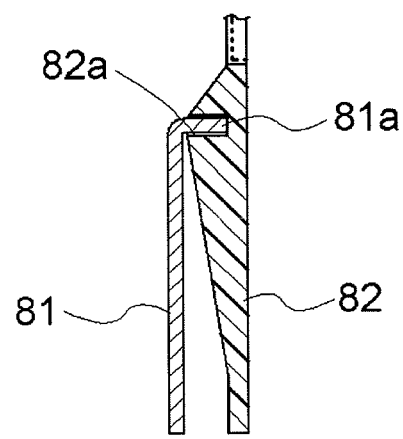
FIG. 10 is a cross-sectional view illustrating a structure for separating and combining the swing hood having the divided structure in FIG. 9.

The swing hood 8B can be integrally formed by welding or plating; however, handling thereof is difficult in assembly or maintenance due to an increase in weight. Thus, a divided structure is preferably employed, as shown in FIG. 9. A bisected structure is employed herein, which includes a first sub-hood 81 in the rear and a second sub-hood 82 in the front. The first sub-hood 81 covers lower areas of the middle area 42 and the front area 41 of the engine compartment 4 in the swing hood 8B, while the second sub-hood 82 covers remaining areas, which is an upper area of the front area 41. As schematically shown in FIG. 10, the second sub-hood 82 is a resin component having a mesh portion surrounded by a frame. The second sub-hood 82 has a gate shape and has a horizontal groove rail 82*a* in a lower end area. Due to flexure thereof, the horizontal groove rail 82*a* is snapped into a horizontal projecting rail 81*a* on the first sub-hood 81, and thus the second sub-hood 82 is connected to the first sub-hood 81. A lock mechanism may be provided to ensure the connection between the second sub-hood 82 and the first sub-hood 81. The mesh portion of the second sub-hood 82 serves as the external air intake 85.

With reference to FIG. 7, a drain plug 61 is provided in a lower end portion of the radiator 60. The radiator 60 is mounted on a radiator mount 60A fixed to the rear frame 10*b*. The radiator mount 60A has an opening 60*a* in a position corresponding to the drain plug 61. A tube 61A reaching the drain plug 61 is externally attached to the opening 60*a*. A front end of the tube 61A surrounds the drain plug 61, while a rear end of the tube 61A extends to a position free from interference with mounted components, including other devices and hoses. Thus, the tube 61A guides a tool for opening and closing the drain plug 61 to the drain plug 61. In addition, the tube 61A also serves as a pipe that directs exhaust liquid from the drain plug 61.

Other Embodiments (1) The present invention limits the layout of the fixed hood 8A, the swing hood 8B, and the driver seat 13 such that the swing hood 8B is positioned between the driver seat 13 and the fixed hood 8A in the anteroposterior direction of the vehicle. Thus, a work vehicle having a fixed hood 8*a* positioned at a front end portion of a vehicle frame 10 in the anteroposterior direction is included in the present invention.

(2) In the embodiment above, the present invention is applied to a front mount mower. The present invention may also be applied to other types of mowers, including a mid-mount mower. Of course, the present invention is applicable to a vehicle other than a mower, such as a work vehicle having an engine compartment 4 in a rear of a vehicle.

(3) The hood 8 may be composed of a resin, a steel, or a hybrid of a resin and a steel.

(4) In the embodiment above, the swing hood 8B is pivoted by the pivot bracket 80, which is supported by the rear frame 10b. Alternatively, the swing hood 8B may be pivoted by the fixed hood 8A, provided that the fixed hood 8A has sufficient strength.

(5) In the embodiment above, the swing hood 8B has a swing range exceeding 90° from the horizontal flat posture. The swing hood 8B is held in the open position at the end of the swing by its own weight and the stopper mechanism. Instead of this configuration, the swing hood 8B may be held in the open position by a damper. In this case, where the weight of the swing hood 8B is not applied, the swing range of the swing hood 8B is 90° or less. Of course, a damper may be used as a swing assisting component in the embodiment above.

(6) The electronic control unit 90 is provided in the right outer area extended by the projections 51 and 52 in the front area 41 of the engine compartment 4. Of course, the electronic control unit 90 may be provided in the left outer area. In a case where there are a plurality of electronic control units 90, they may be separately provided in both areas. Furthermore, a device other than the electronic control unit 90 that needs to be cooled may be disposed in the areas.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A work vehicle comprising:
an engine compartment supported by a vehicle frame and being located behind a driver seat;
the engine compartment comprising a front area, a middle area, and a rear area and being sized and configured to contain therein an engine and at least one engine accessory;
a fixed hood structured and arranged to cover the rear area;
a swing hood movable about a swing axis between at least a closed position and an open position;
the swing axis extending through the rear area along a direction transverse to a longitudinal direction of the vehicle,
wherein, in the open position, the swing hood covers and at least partially contains therein the fixed hood,
wherein, in the closed position, the swing hood covers the front area and middle area and includes a portion that overlaps a front end portion of the fixed hood, and
wherein the swing hood overlaps more of lateral side portions of the fixed hood in the open position than in the closed position.

2. The work vehicle of claim 1, wherein the portion that overlaps the front end portion of the fixed hood overlies the front end portion of the fixed hood in the closed position.

3. The work vehicle of claim 1, wherein, in the open position, the swing hood covers and contains therein all or nearly all of the fixed hood.

4. The work vehicle of claim 1, wherein the swing hood is arranged in a generally horizontal posture in the closed position and is arranged in a generally vertical or upright posture in the open position.

5. The work vehicle of claim 4, wherein the swing hood can pivot about the swing axis between the closed and open position between an angular range.

6. The work vehicle of claim 5, wherein the angular range is between approximately 90 degrees and approximately 120 degrees.

7. The work vehicle of claim 1, further comprising a DPF disposed in the rear area.

8. The work vehicle of claim 1, wherein the fixed hood comprises a generally boxed shape covering that includes a rear panel portion and a left-right pair of side panels, and wherein, in the open position, side panel portions of the swing hood overlie or surround the rear panel and the left-right pair of side panels of the fixed hood.

9. The work vehicle of claim 1, further comprising:
an engine disposed in the middle area;
a cooling fan and radiator disposed in the front area;
a shroud arranged between and separating the middle area from the front area and being oriented along a direction generally parallel to the transverse direction.

10. The work vehicle of claim 1, wherein the swing hood comprises at least one external air intake located at a front area of the swing hood.

11. The work vehicle of claim 1, wherein the swing hood comprises two main sections.

12. A work vehicle comprising:
an engine compartment supported by a vehicle frame;
the engine compartment comprising a front area, a middle area, and a rear area and being sized and configured to contain therein an engine and at least one engine accessory;
a fixed hood;
a swing hood structured and arranged to pivot about around a swing axis at least between a closed position and an open position while the fixed hood remains stationary;
the swing axis extending along a direction transverse to a longitudinal direction of the vehicle,
wherein, in the open position, the swing hood covers and at least partially contains therein the fixed hood,
wherein, in the closed position, the swing hood substantially covers at least one of the front, middle and rear areas of the engine compartment, and
wherein the swing axis is located closer to a bottom of the fixed hood than to a top of the fixed hood.

13. The working vehicle of claim 12, wherein:
in the closed position, the swing hood covers the rear and middle areas and includes a portion that overlaps or overlies a portion of the fixed hood; and
the fixed hood covers the front area.

14. The working vehicle of claim 12, wherein, in the closed position, the swing hood substantially covers two of the front, middle and rear areas of the engine compartment.

15. A work vehicle comprising:
- an engine compartment supported by a vehicle frame and being located behind a driver seat;
- the engine compartment comprising a front area, a middle area, and a rear area and being sized and configured to contain therein an engine and at least one engine accessory;
- a fixed hood structured and arranged to cover the rear area;
- a swing hood movable about a swing axis between at least a closed position and an open position while the fixed hood remains stationary;
- the swing axis extending through the rear area along a direction transverse to a longitudinal direction of the vehicle,
- wherein, in the open position, the swing hood covers and at least partially contains therein the fixed hood,
- wherein, in the closed position, the swing hood covers the front area and middle area and includes a portion that overlaps a front end portion of the fixed hood,
- wherein the swing hood overlaps more of the fixed hood in the open position than in the closed position, and
- wherein the swing axis is located closer to a bottom of the fixed hood than to a top of the fixed hood.

16. The work vehicle of claim 15, wherein, in the open position, the swing hood covers and contains therein all or nearly all of the fixed hood and wherein the swing hood is arranged in a generally horizontal posture in the closed position and is arranged in a generally vertical or upright posture in the open position.

* * * * *